(12) United States Patent
Lin

(10) Patent No.: US 7,654,233 B2
(45) Date of Patent: Feb. 2, 2010

(54) ENGINE DEVICE FOR AN OXYHYDROGEN VEHICLE

(76) Inventor: Wen-Chang Lin, No. 14, Alley 14, Lane 376, Hsi-Chou 1st Rd., Hsi-Chou Tsun, Lin-Yuan Hsiang, Kaohsiung Hsien (TW)

( * ) Notice: Subject to any disclaimer, the term of this patent is extended or adjusted under 35 U.S.C. 154(b) by 0 days.

(21) Appl. No.: 12/036,835

(22) Filed: Feb. 25, 2008

(65) Prior Publication Data

US 2008/0190383 A1   Aug. 14, 2008

(51) Int. Cl.
*F02B 43/08* (2006.01)
(52) U.S. Cl. .................................. 123/3; 123/DIG. 12
(58) Field of Classification Search ............... 123/1 A, 123/3, DIG. 12
See application file for complete search history.

(56) References Cited

U.S. PATENT DOCUMENTS

| | | | |
|---|---|---|---|
| 1,379,077 A | | 5/1921 | Blumenberg, Jr. |
| 3,311,097 A | * | 3/1967 | Mittelstaedt ......... 123/DIG. 12 |
| 5,143,025 A | * | 9/1992 | Munday ..................... 123/3 |
| 5,305,715 A | * | 4/1994 | Nissley ...................... 123/3 |
| 5,458,095 A | * | 10/1995 | Post et al. .................. 123/3 |
| 7,021,249 B1 | | 4/2006 | Christison |
| 7,100,542 B2 | * | 9/2006 | Ehresman ................... 123/3 |
| 2005/0000802 A1 | * | 1/2005 | Hobbs ..................... 204/277 |
| 2005/0268555 A1 | * | 12/2005 | Amendola et al. ............ 48/61 |

\* cited by examiner

*Primary Examiner*—Noah Kamen
(74) *Attorney, Agent, or Firm*—McNees Wallace & Nurick, LLC

(57) ABSTRACT

An engine device for an oxyhydrogen vehicle includes an oxyhydrogen generator for electrolytically converting an electrolyte into oxyhydrogen gas, a fuel tank for storing combustible fuel, a first pipe unit connected to the oxyhydrogen generator, a second pipe unit connected to the fuel tank, and an engine unit. The engine unit includes a cylinder block, an intake manifold, and fuel injectors. The intake manifold is connected to the cylinder block, is provided with passages, and is further connected to the first pipe unit such that the oxyhydrogen gas generated by the oxyhydrogen generator is fed into the passages. The fuel injectors are connected to the intake manifold, are further connected to the second pipe unit, and serve to inject the combustible fuel in the fuel tank into the passages.

7 Claims, 3 Drawing Sheets

US 7,654,233 B2

ENGINE DEVICE FOR AN OXYHYDROGEN VEHICLE

BACKGROUND OF THE INVENTION

1. Field of the Invention

The invention relates to an engine device for a vehicle, more particularly to an engine device for an oxyhydrogen vehicle.

2. Description of the Related Art

U.S. Pat. No. 1,379,077 discloses an apparatus for producing a gaseous fuel vapor that comprises a tank for storing a hydrocarbon fuel, and an electrolytic member for generating oxyhydrogen gas that passes through the fuel in the tank to result in gaseous fuel conducted from the tank to a manifold of an internal combustion engine.

U.S. Pat. No. 7,021,249 discloses a system for generating a hydrogen-enriched fuel for an engine. The system includes a hydrogen generator with an electrolyte tank for generating a hydrogen gas and an oxygen gas from electrolytic solution in the electrolyte tank, and delivery means for delivering hydrocarbon fuel and the generated hydrogen from the electrolyte tank into a venturi mixing tube which is directly connected to a carburetor of the engine. The delivery means includes a fuel pump for delivering the hydrocarbon fuel to the venturi mixing tube. The generated oxygen gas is vented from the electrolyte tank.

In co-pending U.S. patent application Ser. No. 11/593,533, there is disclosed a system for generating hybrid fuel for a combustion engine. The system includes: an electrolytic cell for electrolytically converting water into oxyhydrogen gas, the electrolytic cell having a gas outlet port; a fuel tank defining a fuel chamber therein and adapted to store hydrocarbon fuel in the fuel chamber in such a manner that the fuel chamber is divided by a body of the hydrocarbon fuel in the fuel tank into a liquid fuel-filled portion and a liquid fuel-free portion above the liquid fuel-filled portion, the fuel tank having upper and lower inlet ports; and a gas distributing unit including a control valve connected to the gas outlet port of the electrolytic cell and the upper and lower inlet ports of the fuel tank so as to direct first and second streams of the oxyhydrogen gas into the liquid fuel-free portion and the liquid fuel-filled portion of the fuel chamber, respectively.

SUMMARY OF THE INVENTION

An object of the present invention is to provide an engine device for an oxyhydrogen vehicle that can reduce consumption of combustible fuel, enhance combustion efficiency of the combustible fuel, and reduce carbon monoxide emissions.

According to the present invention, an engine device for an oxyhydrogen vehicle comprises an oxyhydrogen generator for electrolytically converting an electrolyte into oxyhydrogen gas, a fuel tank for storing combustible fuel, a first pipe unit connected to the oxyhydrogen generator, a second pipe unit connected to the fuel tank, and an engine unit. The engine unit includes a cylinder block, an intake manifold, and fuel injectors. The intake manifold is connected to the cylinder block, is provided with passages, and is further connected to the first pipe unit such that the oxyhydrogen gas generated by the oxyhydrogen generator is fed into the passages. The fuel injectors are connected to the intake manifold, are further connected to the second pipe unit, and serve to inject the combustible fuel in the fuel tank into the passages. The oxyhydrogen gas from the first pipe unit is mixed with the combustible fuel from the fuel injectors in the passages to result in hybrid fuel that is supplied to the cylinder block.

BRIEF DESCRIPTION OF THE DRAWINGS

Other features and advantages of the present invention will become apparent in the following detailed description of the preferred embodiment with reference to the accompanying drawings, of which.

DETAILED DESCRIPTION OF THE PREFERRED EMBODIMENT

Figure 1:
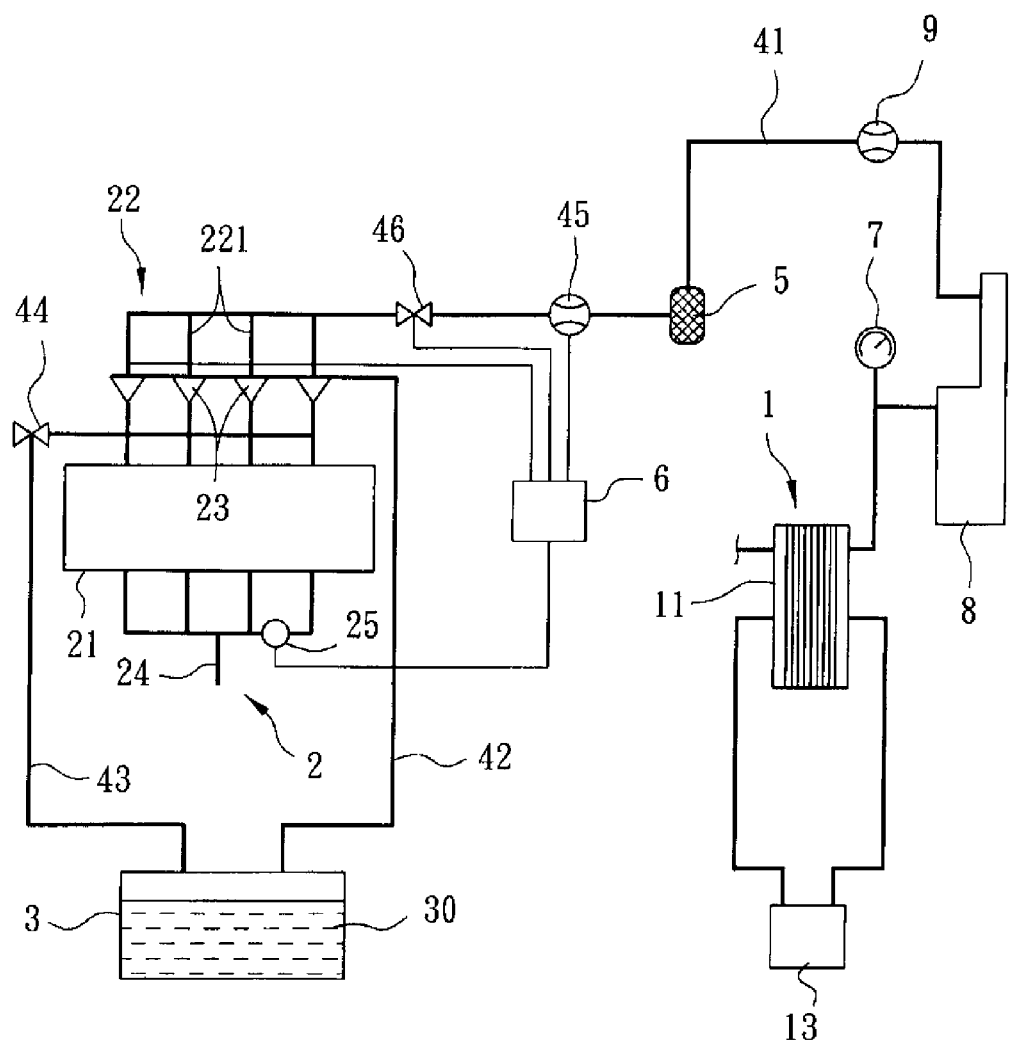
FIG. 1 is a schematic diagram of the preferred embodiment of an engine device for an oxyhydrogen vehicle according to the present invention.
Figure 2:
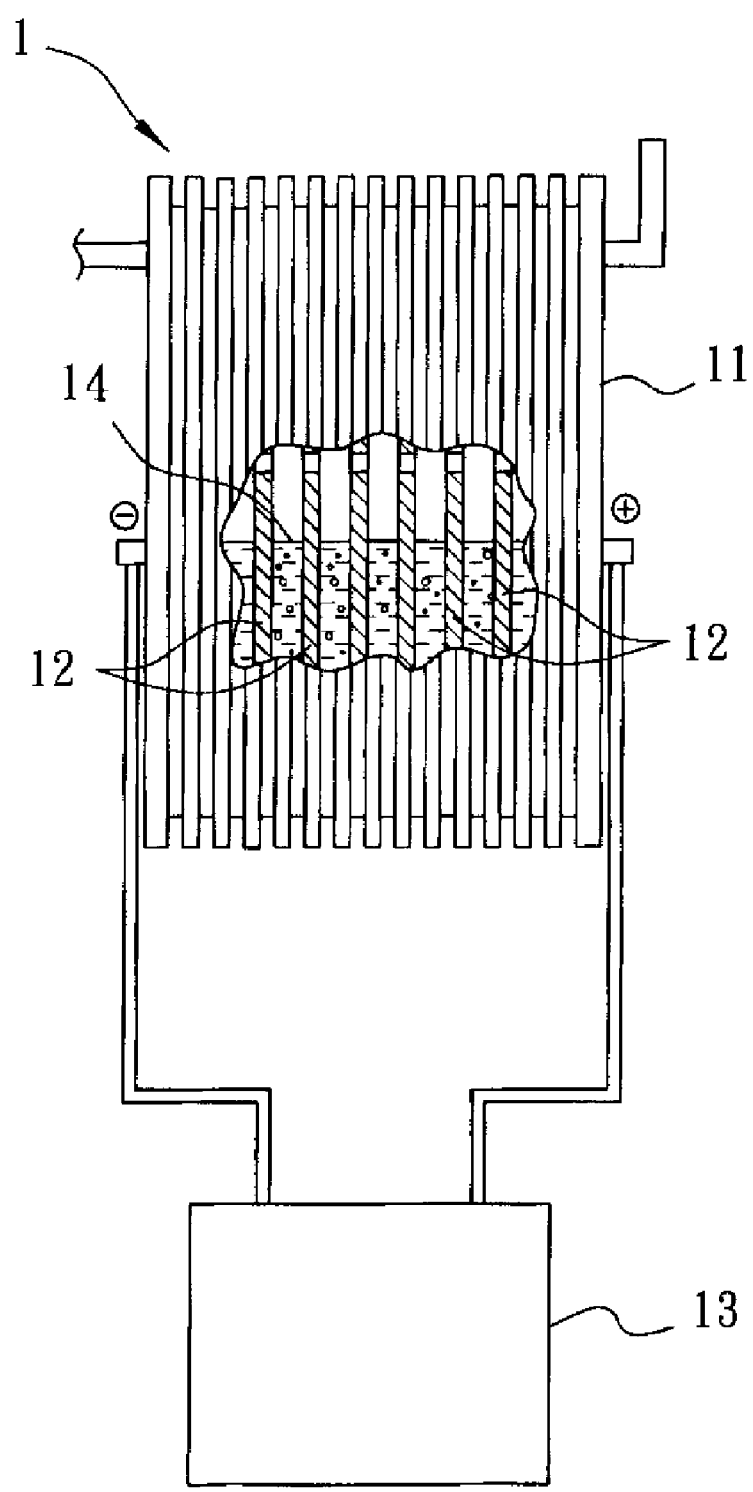
FIG. 2 is a schematic diagram illustrating an oxyhydrogen generator of the preferred embodiment.
Figure 3:
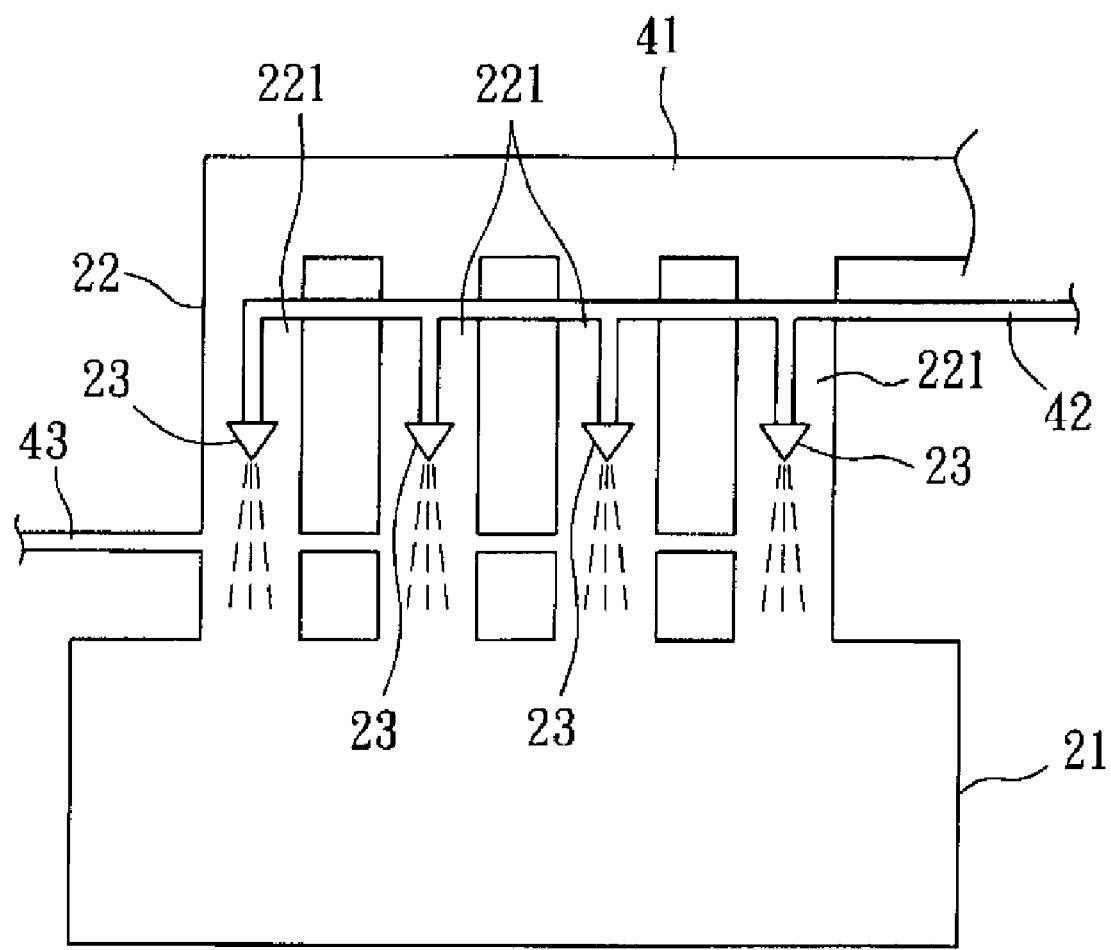
FIG. 3 is a schematic diagram illustrating how oxyhydrogen gas is mixed with combustible fuel in the preferred embodiment.

Referring to FIGS. 1 to 3, the preferred embodiment of an engine device for an oxyhydrogen vehicle according to the present invention is shown to comprise an oxyhydrogen generator 1, a first pipe unit 41 connected to the oxyhydrogen generator 1, a fuel tank 3 for storing combustible fuel 30 (e.g., a hydrocarbon fuel), a second pipe unit 42 connected to the fuel tank 3, and an engine unit 2 connected to the first and second pipe units 41, 42.

The oxyhydrogen generator 1 includes an electrolyte container 11 for receiving an electrolyte 14, a plurality of electrode plates 12 disposed in the electrolyte container 11 in spaced apart relation to one another, and a power source 13 coupled electrically to the electrode plates 12. The oxyhydrogen generator 1 is operable to electrolytically convert the electrolyte 14 in the electrolyte container 11 into oxyhydrogen gas.

The engine unit 2 includes: a cylinder block 21; an intake manifold 22 that is connected to the cylinder block 21, that is provided with passages 221, and that is further connected to the first pipe unit 41 such that the oxyhydrogen gas generated by the oxyhydrogen generator 1 is fed into the passages 221; and fuel injectors 23 that are connected to the intake manifold 22, that are further connected to the second pipe unit 42, and that serve to inject the combustible fuel 30 in the fuel tank 3 into the passages 221 of the intake manifold 22. Therefore, the oxyhydrogen gas from the first pipe unit 41 is mixed with the combustible fuel 30 from the fuel injectors 23 in the passages 221 of the intake manifold 22 to result in hybrid fuel that is supplied to the cylinder block 21 for combustion, thereby resulting in motive power for driving movement of the oxyhydrogen vehicle.

In this embodiment, the engine unit 2 further includes an exhaust pipe 24 connected to the cylinder block 21, and an oxygen content sensor 25 for detecting oxygen content in exhaust gas from the cylinder block 21 and flowing through the exhaust pipe 24.

In this embodiment, a third pipe unit 43 interconnects the engine unit 2 and the fuel tank 3 to permit return flow of excess combustible fuel in the engine unit 2 to the fuel tank 3. Preferably, the third pipe unit 43 is provided with a pressure valve 44.

Preferably, the first pipe unit 41 is provided with: a gas flow sensor 45; a throttle 46; a pressure display 7 for showing pressure in the first pipe unit 41; a vapor filter 8 for removing electrolyte vapor from the oxyhydrogen gas flowing through the first pipe unit 41; a flow display 9 for showing amount of the oxyhydrogen gas flowing through the first pipe unit 41; and a gas filter 5 for filtering the oxyhydrogen gas that is supplied by the oxyhydrogen generator 1 to the engine unit 2 so as to enhance purity of the oxyhydrogen gas.

By virtue of the pressure display 7 and the flow display 9, an operator is able to inspect the pressure in the first pipe unit 41 and the amount of the oxyhydrogen gas flowing through the first pipe unit 41 when conducting maintenance and repair of the engine device.

Preferably, the engine device further includes a computer unit 6 connected electrically to the gas flow sensor 45 and operable so as to determine amount of the oxyhydrogen gas flowing through the first pipe unit 41. The computer unit 6 is further connected electrically to the oxygen content sensor 25 and is further operable so as to determine combustion state of the engine unit 2 based on the oxygen content detected by the oxygen content sensor 25. The computer unit 6 is connected electrically to the throttle 46 and controls the throttle 46 based on factors, such as weather conditions, the type of the combustible fuel 30, the determined amount of the oxyhydrogen gas flowing through the first pipe unit 41, and the oxygen content in the exhaust gas from the cylinder block 21, thereby regulating the flow of the oxyhydrogen gas through the first pipe unit 41 to ensure an appropriate ratio of the oxyhydrogen gas to the combustible fuel 30 in the hybrid fuel so as to achieve a desired engine efficiency.

Because the engine device of this invention runs on hybrid fuel, consumption of the combustible fuel 30 can be reduced, combustion efficiency of the combustible fuel 30 can be enhanced, and carbon monoxide emissions can be reduced.

While the present invention has been described in connection with what is considered the most practical and preferred embodiment, it is understood that this invention is not limited to the disclosed embodiment but is intended to cover various arrangements included within the spirit and scope of the broadest interpretation so as to encompass all such modifications and equivalent arrangements.

What is claimed is:

1. An engine device for an oxyhydrogen vehicle, comprising:
    an oxyhydrogen generator for electrolytically converting an electrolyte into oxyhydrogen gas;
    a fuel tank for storing combustible fuel;
    a first pipe unit connected to said oxyhydrogen generator;
    a second pipe unit connected to said fuel tank;
    an engine unit including
        a cylinder block,
        an intake manifold that is connected to said cylinder block, that is provided with passages, and that is further connected to said first pipe unit such that the oxyhydrogen gas generated by said oxyhydrogen generator is fed into said passages, and
        fuel injectors that are connected to said intake manifold, that are further connected to said second pipe unit, and that serve to inject the combustible fuel in said fuel tank into said passages,
    the oxyhydrogen gas from said first pipe unit being mixed with the combustible fuel from said fuel injectors in said passages to result in hybrid fuel that is supplied to said cylinder block;
    wherein said engine unit further includes an exhaust pipe connected to said cylinder block, and an oxygen content sensor for detecting oxygen content in exhaust gas from said cylinder block and flowing through said exhaust pipe;
    a gas flow sensor provided on said first pipe unit;
    a throttle provided on said first pipe unit; and
    a computer unit connected electrically to said gas flow sensor and operable so as to determine amount of the oxyhydrogen gas flowing through said first pipe unit;
    said computer unit being further connected electrically to said oxygen content sensor and being further operable so as to determine combustion state of said engine unit based on the oxygen content detected by said oxygen content sensor; and
    said computer unit being connected electrically to said throttle and controlling said throttle based on output of at least one of said gas flow sensor and said oxygen content sensor so as to regulate flow of the oxyhydrogen gas through said first pipe unit.

2. The engine device as claimed in claim 1, further comprising a pressure display for showing pressure in said first pipe unit.

3. The engine device as claimed in claim 1, further comprising a vapor filter provided on said first pipe unit for removing electrolyte vapor from the oxyhydrogen gas flowing through said first pipe unit.

4. The engine device as claimed in claim 1, further comprising a flow display for showing amount of the oxyhydrogen gas flowing through said first pipe unit.

5. The engine device as claimed in claim 1, further comprising a gas filter provided on said first pipe unit for filtering the oxyhydrogen gas that is supplied by said oxyhydrogen generator to said engine unit.

6. The engine device as claimed in claim 1, further comprising a third pipe unit that interconnects said engine unit and said fuel tank to permit return flow of excess combustible fuel in said engine unit to said fuel tank.

7. The engine device as claimed in claim 6, further comprising a pressure valve provided on said third pipe unit.

* * * * *